United States Patent
Reinicke

[11] Patent Number: 5,111,092
[45] Date of Patent: May 5, 1992

[54] DEVICE FOR SENSING RECIPROCATED ARMATURE POSITION

[75] Inventor: Robert H. Reinicke, Mission Viejo, Calif.

[73] Assignee: Marotta Scientific Controls, Inc., Montville, N.J.

[21] Appl. No.: 664,595

[22] Filed: Mar. 1, 1991

[51] Int. Cl.$^5$ .............. H02K 33/00; H01L 43/06; G01R 33/06; F16K 31/06
[52] U.S. Cl. .................. 310/68 B; 137/554; 310/15; 324/207.2; 340/551; 361/179
[58] Field of Search .......... 137/554; 310/15, 17, 310/23, 67 R, 68 B, 13, 14; 338/32 H; 307/116; 340/551, 686; 361/179

[56] References Cited

U.S. PATENT DOCUMENTS

| | | | |
|---|---|---|---|
| 4,086,519 | 4/1978 | Persson | 324/207.2 |
| 4,267,544 | 5/1981 | Wiblin | 338/32 H |
| 4,310,143 | 1/1982 | Determan | 251/129.08 |
| 4,319,236 | 3/1982 | Brace et al. | 310/15 |
| 4,524,932 | 6/1985 | Bodziak | 340/941 |
| 4,578,956 | 4/1986 | Young | 310/15 |
| 4,673,827 | 6/1987 | Sommer | 307/116 |

*Primary Examiner*—Steven L. Stephan
*Assistant Examiner*—D. L. Rebsch
*Attorney, Agent, or Firm*—Hopgood, Calimafde, Kalil, Blaustein & Judlowe

[57] ABSTRACT

Two opposed poles of a permanently magnetized circuit establish a relatively large air gap. An armature element (15) is displaceably interposed in the gap between these poles. The armature element establishes a first relatively small gap to one of these poles when in a first position of adjacency to the other of these poles, and the armature element establishes a second relatively small gap to the other of said poles when in a second position of adjacency to said one pole. Pole-fringing flux is manifested laterally of that one of the relatively small gaps which uniquely identifies the instantaneous presence of the armature in one of its two positions, and a detector of fringe flux at one of the two gaps (18) provides an indication of the positional status of the armature with respect to the poles.

10 Claims, 2 Drawing Sheets

DEVICE FOR SENSING RECIPROCATED ARMATURE POSITION

BACKGROUND OF THE INVENTION

The invention relates to a magnetic alternative to mechanical snap-action switches which have been used for many years, for example, to monitor the actual position of actuators and fluid controls.

Mechanical snap-action switches, sometimes called microswitches and/or limit switches, present many problems and limitations, particularly miniaturized versions of such switches when needed to monitor the positional condition of a small valve member, or when needed for operation in a corrosive atmosphere. Such mechanical switches are often less reliable than the devices they monitor, as when space launches and aircraft departures have been delayed and sometimes scrubbed because of faulty signals from these mechanical switches during preflight check-out procedures. If a valve effluent is any other than dry inert gas (which it often is), the valve-position-monitoring switch must be sealed from effluent contact, to avoid corrosion of the switch mechanism or an explosion (or fire) hazard; such conditions introduce the cost and complexity of a diaphragm or bellows seal.

Miniaturized mechanical switches are not suitable for use with miniature actuators and valves weighing less than 100 grams because of their size and/or weight, and often because they require relatively great actuating force. Moreover, the stroke requirements of such micro-switches, namely, due to pre-travel, travel and post-travel, are often greater than the position change being monitored.

Even in application to valves which are not miniaturized, miniature mechanical switches usually give only crude indications of actual valve-member position, for example, "open" and "not open", which is to be compared with the desired information "open" and "closed".

Some manufacturers have used magnetic-reed switches in an effort to overcome problems of miniaturized mechanical switches. The magnetic-reed switch can solve the effluent-sealing and safety problems, because each is hermetically encapsulated in a glass envelope. But other problems remain in application of reed switches to miniature valves and actuators; these other problems include poor reliability, high cost, and excessive size.

More recently, electronics have been employed to sense valve and/or actuator position, by non-contacting, non-mechanical means. Proximeters and other solid-state position sensors are now on the market, and U.S. Pat. No. 3,789,876 is an example of a variable-inductance position-sensing technique, specific to a bi-latch style of latching valve.

BRIEF STATEMENT OF THE INVENTION

It is an object of the invention to provide an improved position-sensing device, having application to a variety of sizes of displacement to be measured, wherein the variety extends to miniaturized valve and actuator configurations.

A specific object is to meet the above object with the inherent ability, in the case of a miniature valve, to certify "valve-open" and "valve-closed" conditions with greatly increased certainty and reliability than heretofore.

Another specific object is to meet the above objects with apparatus which does not contact or in any way deletereously affect operation of the valve or actuator which is being monitored.

Still another specific object is to provide a latching-valve construction which is not only magnetically latched and actuated, but which is also continuously monitored for valve-member position by magnetic means that is independent of the latching and actuating means.

A position-sensor of the invention achieves the above objects by providing a permanently magnetized circuit having two opposed poles which establish a relatively large air gap. An armature element is displaceably interposed in the gap between these poles. The armature element establishes a first relatively small gap to one of these poles when in a first position of adjacency to the other of these poles, and the armature element establishes a second relatively small gap to the other of said poles when in a second position of adjacency to said one pole. Pole-fringing flux is manifested laterally of that one of the relatively small gaps which uniquely identifies the instantaneous presence of the armature in one of its two positions, and a detector of fringe flux at one of the two gaps provides an indication of the positional status of the armature with respect to the poles.

In application to a valve, the armature is a valve member, operative to seat or unseat with respect to a fluid port at one end (or at each of the ends) of the armature; the armature is actuated to shuttle from a valve-closed condition at one end (while in valve-closed condition at its other end), to a valve-open (gap) condition at said other end (while in valve-closed condition at said one end). The permanently magnetized circuit involves a permanent magnet in common to two like flux paths each of which shares a separate half of the armature and, therefore, provides a magnetic-latch function for each of the shuttled positions of the armature. Separate coils, each of which is coupled to a different one of the two flux paths, are operative to effect armature displacement in over-ride of the magnetic-latch, from one to the other of the armature-shuttle positions. Fringe-flux detection at one or both gap-forming locations provides an indication of the "valve-open" or "valve-closed" condition from monitoring points adjacent each end of the armature.

DETAILED DESCRIPTION

The invention will be described in detail in conjunction with the accompanying drawings, in which.

Figure 1:
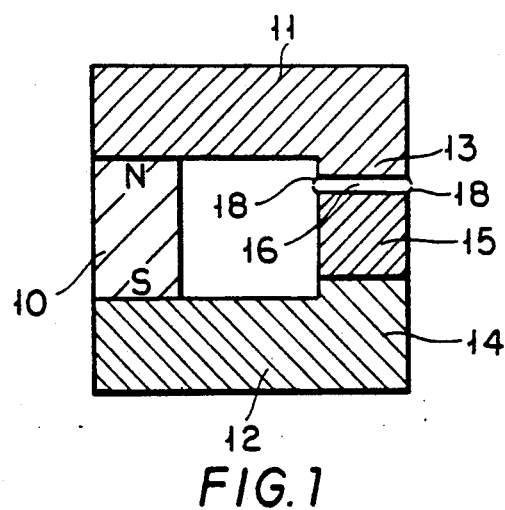
FIG. 1 is a simplified diagram of magnetic components of a position-sensing device of the invention, shown in position to generate a first position-measuring condition.
Figure 2:
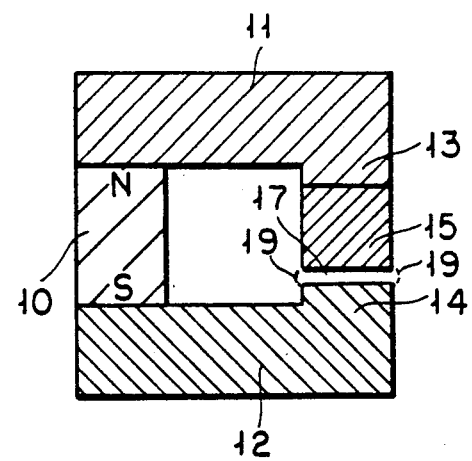
FIG. 2 is a diagram similar to FIG. 1, shown in another position, to generate a second position-measuring condition.

In FIG. 1, a permanently polarized magnetic circuit is established over a rectangular course, wherein a permanent magnet element forms a first leg 10. Like, opposed elements 11, 12 of magnetic-flux-conducting material lap the respective ends of leg 10, to form second and third legs. Each of the elements 11, 12 is shown to be L-shaped, whereby to establish opposed poles 13, 14 in a fourth leg in which a relatively large gap exists between poles 13, 14. An armature 15 of magnetic-flux-conducting material is of shorter length than the relatively large gap between poles 13, 14, and armature 15 is displaceable longitudinally within this relatively large gap. Thus, in a first position of armature adjacency to the lower pole 14, a first relatively small air gap exists between the upper end of the armature and the upper pole 13, as shown in FIG. 1; and in a second position of armature adjacency to the upper pole 13, a similar relatively small air gap 17 exists between the lower end of the armature and the lower pole 14, as shown in FIG. 2. It is a property of magnetic flux that lines of flux will be smooth and continuous through all parts of a magnet circuit which are of flux-conducting material, but that an air gap represents a discontinuity wherein flux lines bulge outwardly as fringe flux, peripherally outward of the confronting pole areas across the gap. In FIG. 1, this fringe flux is symbolized by external bulges 18, outward of gap 16; and in FIG. 2, this fringe flux is symbolized by external bulges 19, outward of gap 17.

Figure 3:
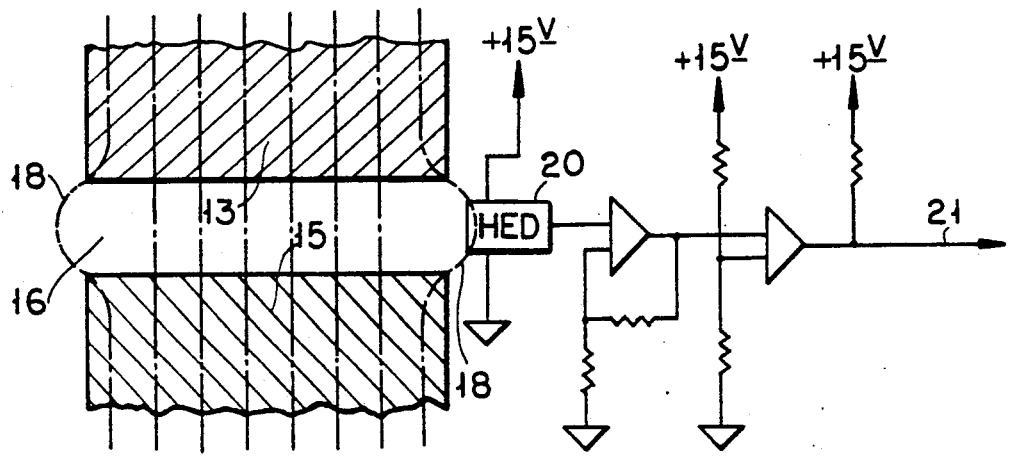
FIG. 3 is an enlarged fragmentary diagram, to show detail for an open-gap relationship of FIG. 1, with means to detect and indicate the open-gap relationship.

On an enlarged scale, FIG. 3 illustrates, by a series of generally parallel phantom lines, the nature of flux lines over the area of confronting poles across the gap 16 of FIG. 1, it being noted that the upper end face of armature 15 is effectively a south pole, confronting north polarity at pole 13. Fringe flux 18 is seen to bulge outwardly of the confronting areas of pole 13 and armature 15, and a Hall-effect detector 20, positioned laterally outside these confronting areas, is seen to be directly exposed to fringe flux 18. The Hall-effect detector 20 will be understood to be fixedly located with respect to magnetic-circuit elements 10, 11, 12, and to be served by conventional solid-state electronic elements, so as to produce an output signal at 21, signifying detected presence of fringe flux, meaning that gap 16 exists and that therefore armature 15 is in its down position of contact with the lower pole 14. A suitable detector 20 and associated solid-state circuitry is available as a monolithic chip, type OMH 3019, from Optek Technology, Inc., of Carrollton, Tex.

Figure 4:
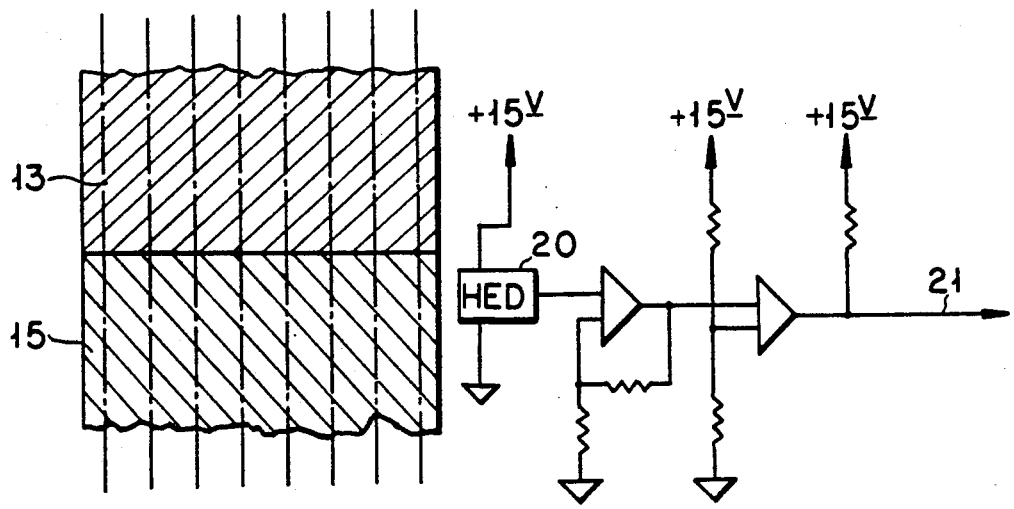
FIG. 4 is a diagram similar to FIG. 3, to show local detail for the closed condition of the gap of FIG. 3.

On the other hand, when armature 15 is displaced upwardly into contact with the upper pole 13, as shown in FIGS. 2 and 4, all flux lines become continuous by reason of closure of gap 16, and the Hall-effect detector 20 has no fringe flux to detect. The output signal at 21 is therefore zero, and this condition is cleanly and unmistakably interpretable to indicate that armature 15 is in its lower position.

It thus is possible to use the fringe-flux response (or not) of the single Hall-effect detector 20 as the indicator of armature (15) position, whether in its up position or in its down position. However, if further assurance is required, redundant indications may be derived by a second Hall-effect detector (not shown) fixedly mounted to respond to fringe flux 19 developed at gap 17 when armature 15 is in its up position of contact with the upper pole 13, as shown in FIGS. 2 and 4.

It will be understood that it is a feature of the magnetic circuitry described in connection with FIGS. 1 to 4 that whenever armature 15 is positioned to contact one of the poles 13, 14, it becomes magnetically latched thereto, in view of the permanent polarization available from magnet 10, which is shown as a ceramic, e.g., a ferrite. The elements 13, 15 of FIGS. 2 and 4 are therefore in latched condition, and the elements 14, 15 of FIG. 1 are in latched condition. The latching force will depend upon the strength of magnet 10, and in any event this latching force must be overcome each time armature 15 is moved from one to the other of its possible positions.

Figure 5:
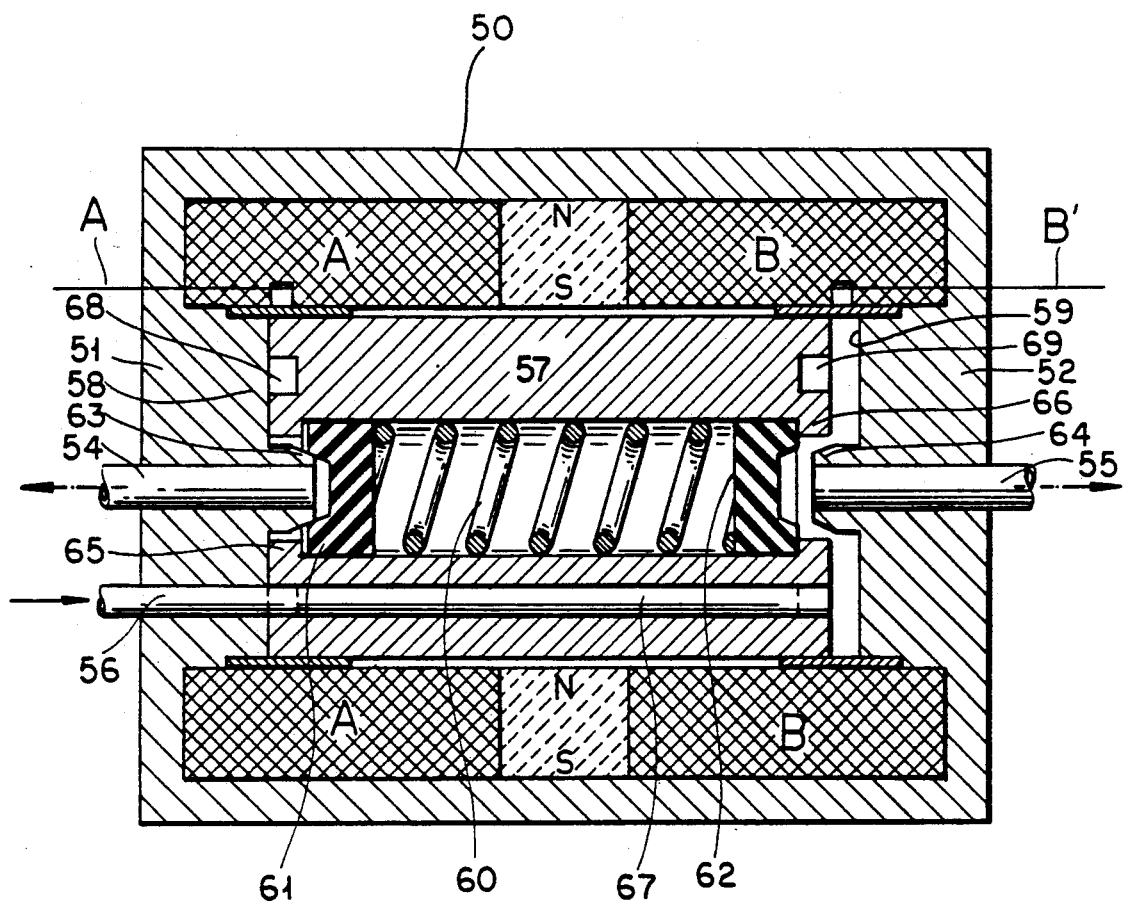
FIG. 5 is a simplified longitudinal section of a bi-latch valve incorporating position-sensing means of the invention, to provide positive instantaneous external indication of valve-member position within the valve.

FIG. 5 illustrates application of the invention to a valve for control of flow of a pressure fluid, using principles discussed in connection with FIGS. 1 to 4.

The valve of FIG. 5 generally resembles the valve disclosed in U.S. Pat. No. 3,814,376, in that both the valve of the patent and the valve of FIG. 5 are magnetically actuated between open and closed conditions, and they are both magnetically latched in each of these positions. However, in the valve of this patent, there are no means of externally indicating the positional status of the valve member.

The valve of FIG. 5 has a cylindrical body of magnetic-flux-conducting material; this body comprises an outer cylindrical annular wall 50 and separate circular closure walls 51, 52 for the respective ends of the annular wall 50. These walls 50, 51, 52 will be understood to be separate fitted component parts, but they are shown as a single part, in order to simplify interpretation of involved magnetic circuitry. A radially polarized annular magnet 53 has continuous peripheral contact with and is supported by the inner surface of the outer body wall 50, being longitudinally centrally positioned within wall 50. Ported access for controlled pressure-fluid flows is available via the central longitudinal axis of the valve body, namely, a passage 54 in end wall 51 and a passage 55 in the end wall 52. It will later become clear that in the valve of FIG. 5, the passages 54 and 55 are valve outlets, selectively controlled by means operative upon supply of pressure fluid at an inlet-port connection 50 to a further passage 56 in end wall 51.

The magnetic circuitry of FIG. 5 is completed by an annular armature 57 which can be shuttled between its leftward position of contact with the annular pole region 58 of the left-hand closure wall 51, to its rightward position of contact with the corresponding annular pole region 59 of the right-hand closure wall 52; for simplicity, armature 57 is shown as a single piece, and in practice it must comprise at least two parts. The bore of armature 57 accommodates a spring 60 which compressionally loads valve-member inserts 61, 62 in axially opposite directions, for selective valve-closing/valve-opening seat relationships with outlet port formations 63, 64; shoulders 65, 66 at the respective ends of the armature bore assure spring-loaded retention of the valve-member inserts 61, 62. A through-passage 67 runs the length of armature 57, and is shown communicating with inlet port 56 and with annular manifolding grooves 68, 69 in the respective end faces of the armature. The leftward armature (57) position shown establishes closure of outlet port 54, while also establishing the fully-retracted position of insert 62, thus fully opening the outlet port 55; similarly, when armature 57 is in its rightward position of contact with pole 59, the outlet port 55 is closed by valve-member insert 62, and the other valve-member insert 61 is fully retracted, thus fully opening the outlet port 54. As shown, the effective spacing between outlet-port seats 63, 64 is such in relation to the spacing between shoulders 65, 66 and the total gap-closing displaceability of the armature, that any valve closure (such as that depicted at 61, 63) will be accompanied by slight axial relief of the involved valve-member insert (61) from its adjacent shoulder (65), thus assuring resilient loading of valve-closed positions.

Due to the central positioning of the annular permanent magnet 53, the leftward armature position shown in FIG. 5 is magnetically latched to retain this position until actuated for rightward displacement; this latching involves completion of a first toroidal flux path in the left half of the described structure, namely, from magnet 53, leftward along outer wall 50 to end wall 51, radially inward in end wall 51, and through the left half of armature 57, to the point of completion to magnet 53 across a very small air gap which is occasioned by one or more thin sleeves for piloting guidance of armature displacement. Once actuated to close outlet port 55, a similar magnetic-latch action applies for a second toroidal flux path in the right half of the described structure. Consistent with the teaching of U.S. Pat. No. 3,814,376, a first winding A coupled to the first-mentioned flux path is excitable to overcome magnetic-latching force which would otherwise retain the closed condition of outlet 55, thus shifting the armature to the FIG. 5 position of outlet-54 closure; similarly, a second winding B coupled to the second-mentioned flux path is excitable to overcome magnetic-latching force which would otherwise retain the closed condition of outlet 54, thus shifting the armature to the right, for opening of outlet 54 and closing of outlet 55.

For monitoring the open and closed condition of the respective outlet ports 54, 55, a Hall-effect detector is shown positioned for fringe-flux detection at each of the two possible gaps of armature 57 with respect to poles 58, 59. Each of these detectors is small and, as noted above may incorporate its own solid-state signal-processing electronics; these detectors are therefore merely identified by notations A' and B' applied to their schematically indicated external lead connections. The signal developed at A' signifies the detection of fringe flux accompanying an opening of outlet 54 and a closing of outlet 55, while a signal developed at B' is redundantly confirmatory in that it signifies the detection of fringe flux accompanying an opening of outlet 55 and a closing of outlet 54.

Figure 6:
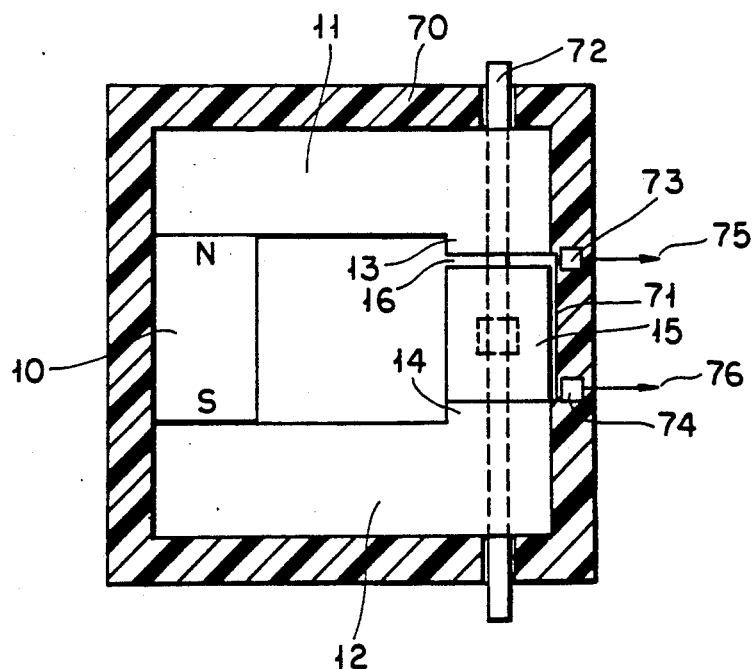
FIG. 6 is a simplified drawing generally similar to FIG. 1, to show the invention as a position-sensing article of manufacture.

In the position-sensing article of FIG. 6, basic magnetic-circuit elements are as described in connection with FIGS. 1 to 4 and therefore the same reference numbers are used, for simplified discussion. The article of FIG. 6 is contained within a casing 70 of magnetically transparent material which at the region of adjacency to armature 15 has a clearance relation 71 thereto, to permit freedom for mechanical actuation of armature 15, pursuant to external-force application to one or the other end of an armature-positioning rod 72 of magnetically transparent material. Rod 72 is fixed to armature 15 and is guided in aligned bores through the poles 13, 14 and adjacent body material of elements 11, 12 of the magnetic circuit. Although one Hall-effect device 73 will suffice in the fringe-flux region adjacent gap 16, a second such device 74 is shown in adjacency to the fringe-flux region which will develop when armature 15 is actuated to its upper position, as by upward thrust of rod 72. Whether one (73) or two Hall-effect detectors (73, 74) are used, the casing 70 offers the convenience of fixedly mounting any and all means of fringe-flux detection, with suitable electrical outputs 75, 76 for indicating purposes.

What is claimed is:

1. A position-sensing device, comprising a permanently magnetized circuit having two opposed poles establishing a relatively large air gap, an armature element displaceably interposed between said poles to establish (a) a relatively small gap to one of said poles when in a first position of adjacency to the other of said poles, so that pole-fringing flux is manifested in a local region laterally of said one pole when said armature element is in said first position, and (b) a condition of no gap at said one pole when said armature element is in a second position of adjacency to said one pole, whereby the presence of fringe flux in said local region is indicative of said armature in said first position, and whereby the absence or substantially reduced fringe flux in said local region is indicative of said armature in said second position; and means responsive to the presence of fringe flux in said local region for indicating the positional status of said armature with respect to said poles.

2. A position-sensing device, comprising a circuit of magnetic-flux conducting material, said circuit having two opposed pole pieces establishing a relatively large air gap, means for polarizing said circuit, an armature element displaceably interposed between said poles to establish (a) a first relatively small gap to one of said poles when in a first position of adjacency to the other of said poles, so that pole-fringing flux is manifested in a local region laterally of said one pole when said armature element is in said first position, and (b) a condition of no gap at said one pole when said armature element is in a second position of adjacency to said one pole, whereby the presence of fringe flux in said local region is indicative of said armature in said first position, and whereby the absence or substantially reduced fringe flux in said local region is indicative of said armature in said second position; and means responsive to the presence of fringe flux in said local region for indicating the positional status of said armature with respect to said poles.

3. The position-sensing device of claim 1 or claim 2, in which said last-defined means includes a Hall-effect detector.

4. The position-sensing device of claim 1 or claim 2, in which said last-defined means is one of two, the second such means being responsive to the presence of fringe flux at the other of said gaps.

5. The position-sensing device of claim 2, in which said polarizing means is a permanent magnet.

6. The position-sensing device of claim 2, wherein said armature is part of a valve member in a valve wherein the valve member is movable between first and second positions of valve control corresponding to said first and second positions of said armature.

7. The position-sensing device of claim 1 or claim 2 as an article of manufacture which is contained within a casing of magnetically neutral material, said last defined means being a Hall-effect detector carried by said casing in the region of fringe-flux development adjacent said first relatively small gap, and externally accessible means for mechanically displacing said armature within said casing.

8. The position-sensing device of claim 1 or claim 2 as an article of manufacture which is contained within a casing of magnetically neutral material, said last-defined means being a Hall-effect detector carried by said casing in the region of fringe-flux development adjacent said first relatively small gap, said Hall-effect detector being one of two such detectors, the other of which is similarly carried by said casing in the region of fringe-flux development adjacent the other of said poles.

9. A position-sensing device, comprising a magnetic circuit including a core element having two opposed pole faces establishing an air gap of relatively large span, and an armature element of thickness less than said span; said armature element being continuously interposed between said pole faces and displaceable from a first position of adjacency to one pole face with gap to said second pole face, to a second position of adjacency to the other of said pole faces with gap to said one pole face; means for polarizing said circuit; and fringe-flux detection means local to and laterally adjacent said one pole face for detecting whether said armature element is in said first or said second position.

10. A position-sensing device, comprising a magnetic circuit including a core element defining a gap between two opposed pole faces, and an armature element movable between a first position of adjacency to one of said pole faces and a second position of adjacency to the other of said pole faces, there being a gap between said armature and said one pole face when said armature element is in said second position and a gap between said armature element and said other pole face when said armature element is in said first position, means for polarizing said circuit, and fringe-flux detection means local to and laterally adjacent said one pole face for detecting whether said armature element is in said first or said second position.

* * * * *